United States Patent [19]

Hirvonen

[11] 4,325,560
[45] Apr. 20, 1982

[54] TANK TRUCK VEHICLE FOR TRANSPORTING FLUID OR PULVEROUS MATERIAL, PARTICULARLY OIL

[75] Inventor: Reijo Hirvonen, Mähkönkatu 12 A, 81720 Lieksa 2, Finland

[73] Assignees: Hollming Oy; Reijo Hirvonen, both of Finland

[21] Appl. No.: 20,412

[22] Filed: Mar. 14, 1979

[30] Foreign Application Priority Data

Mar. 14, 1978 [FI] Finland ................................. 780799
Apr. 17, 1978 [FI] Finland ................................. 781162
Mar. 1, 1979 [FI] Finland ................................. 790707

[51] Int. Cl.³ ............................................. B60P 3/22
[52] U.S. Cl. ................................. 280/5 D; 105/358; 280/5 F; 280/81 R; 580/677; 296/15
[58] Field of Search .............. 280/5 R, 5 F, 5 D, 5 C, 280/81 R, 676, 677, 678; 296/10, 15, 31 P; 105/358, 360, 362

[56] References Cited

U.S. PATENT DOCUMENTS

| | | | |
|---|---|---|---|
| 2,026,826 | 1/1936 | Dillon | 280/5 D |
| 2,540,859 | 2/1951 | Birkin | 280/5 D |
| 2,632,577 | 3/1953 | Sacco | 280/5 D |
| 2,636,743 | 4/1953 | Frazier | 280/5 D |
| 2,675,682 | 4/1954 | Dobson | 280/5 D |
| 3,308,769 | 3/1967 | Halcomb et al. | 105/358 |
| 3,529,552 | 9/1970 | Bolte et al. | 105/358 |
| 4,099,740 | 7/1978 | McGee | 280/678 |
| 4,131,214 | 12/1978 | Rogers | 280/5 D |

Primary Examiner—Joseph F. Peters, Jr.
Assistant Examiner—Donn McGiehan
Attorney, Agent, or Firm—Steinberg & Raskin

[57] ABSTRACT

A tank truck vehicle for transporting fluid or pulverous material, such as oil, comprises in one embodiment a longitudinally extending tubular shell whose length is substantially that of the truck vehicle and which is formed so as to be sufficiently rigid so as to function both as the wall of the transporting container of the vehicle and, simultaneously, as the supporting frame for the vehicle so that there is no need for a supporting beam frame separate from the supporting tank as is conventional. The front and rear wheels are mounted on axle assemblies which are substantially directly connected to the tubular shell.

4 Claims, 9 Drawing Figures

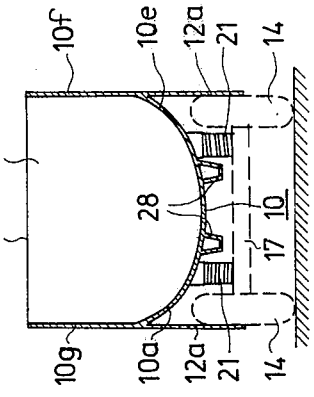
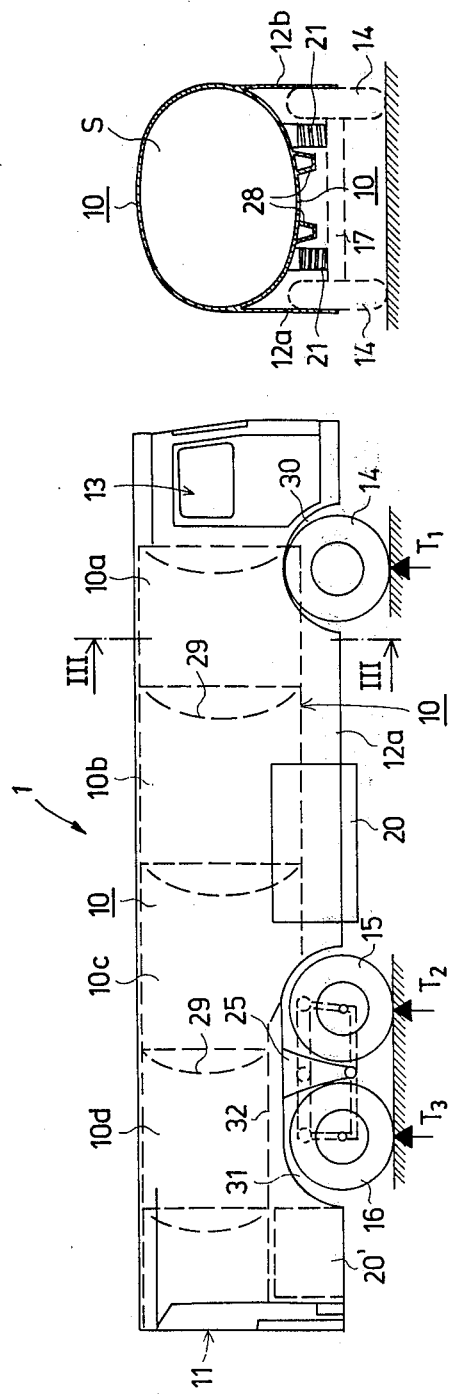
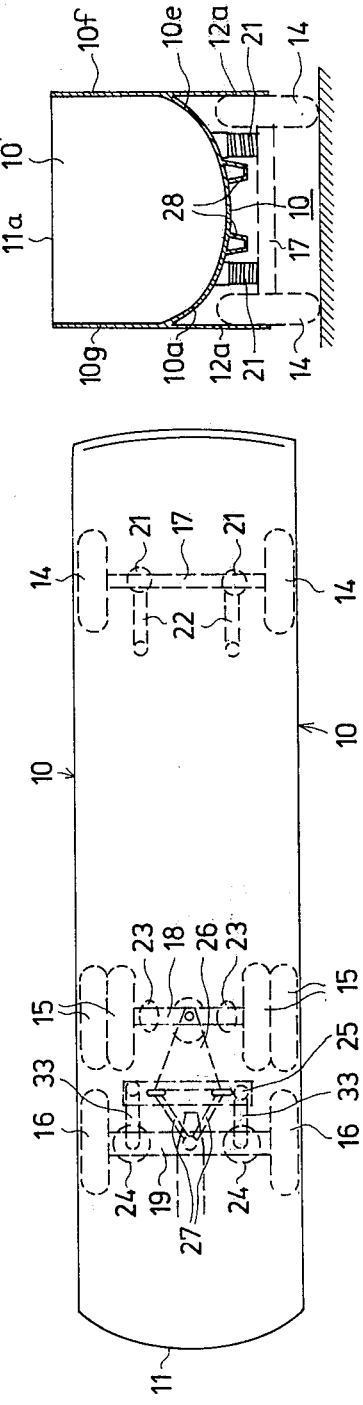

TANK TRUCK VEHICLE FOR TRANSPORTING FLUID OR PULVEROUS MATERIAL, PARTICULARLY OIL

BACKGROUND OF THE INVENTION

This invention relates, generally, to land vehicles and, more particularly, to vehicles of the tank truck type adapted for transporting fluid, pulverous, granular and-/or chipped material and, in particularly, for transporting oil.

Conventional tank truck vehicles generally comprise standard trucks equipped with cabins and longitudinally extending frames constructed of interconnected beams. Such a conventional tank truck vehicle is normally subsequently fitted with a container onto the beam frame for transporting fluid or pulverous material and the like.

Since it is usually economically efficient for conventional tank truck vehicles to be designed for as universal use as possible, such vehicles are generally designed to be capable of withstanding the most rigorous use taking into account the possibilities that in some applications the vehicle may become overloaded. This, for example, in the case of the transport of timber, should the vehicle travel over uneven roads or around sharp turns, the timber has a tendency to shift within the transporting container whereupon the load will be unevenly applied on the wheels on one side of the tank vehicle.

Because of the desirability and, in some cases, necessity of designing the tank vehicle for the most severe payload condition, a relatively low ratio of actual payload to dead weight of the vehicle is usually obtained. Of course, this is not economically desirable.

Further, conventional tank truck vehicles are relatively costly in manufacture due to their particular construction as described above. The connection of the axle systems to the frame structure of conventional tank truck vehicles is relatively complicated and, further, conventional tank truck vehicles present a high air resistance due to their configuration.

SUMMARY OF THE INVENTION

Accordingly, one object of the present invention is to provide a new and improved tank truck vehicle wherein the above-described disadvantages are avoided.

Another object of the present invention is to provide a new and improved tank truck vehicle wherein the payload to dead weight ratio is increased relative to conventional structures.

Still another object of the present invention is to provide a new and improved tank truck vehicle wherein the air resistance presented by the vehicle during use is substantially reduced relative to conventional tank truck vehicles.

Still yet another object of the present invention is to provide a new and improved tank truck vehicle which is structurally stronger and less costly in manufacture than conventional tank truck vehicles.

A further object of the present invention is to provide a new and improved tank truck vehicle wherein the axle systems are connected to the frame structure in a more favorable manner than in conventional tank truck vehicles.

In accordance with the present invention, these and other objects are obtained by providing a tank truck vehicle comprising in one embodiment an elongate tubular shell, whose length essentially defines the length of the vehicle itself, the tubular shell being of sufficient rigidity so that the shell at the same time functions both as the transporting container of the vehicle and as the very supporting frame therefor. In this manner, the need for a separate beam frame for supporting the transporting container which is normally required in conventional vehicles of this type is obviated.

A tank truck vehicle constructed according to the present invention as defined above can be designed in a manner such that it cannot be overloaded or become overloaded during use. In this connection, the fact that the frame of the vehicle has a tubular or similar construction provides the vehicle with favorable strength properties under both bending and torsion loads so that heavier payloads can be accommodated and any shifting of such payloads during travel over bumpy terrain will not adversely affect the operation thereof.

Additionally, the tubular shell which comprises both the transporting container as well as the supporting frame for the vehicle can be constructed of relatively light and corrosion-resistant material, such as aluminum or rust-proof steel, which will result in a considerably extended life-span for the vehicle. Thus, whereas conventional tank truck vehicles have a life span of approximately five years, a tank truck vehicle constructed according to the present invention will have a life span of up to 15 years. This extended life is at least partially made possible by providing the various drive components thereof in a manner such that one or more of them can be easily replaced. For example, the engine, transmission unit, and/or wheel suspension units are substantially directly connected to the tubular shell in an easily replaceable manner so that upon becoming worn out, any one or more of these components may be easily replaced. The axle systems of the vehicle are connected to the tubular frame in a more favorable manner than is possible in connection with conventional tank truck vehicles.

DESCRIPTION OF THE DRAWINGS

A more complete appreciation of the invention and many of the attendant advantages thereof will be readily appreciated as the same becomes better understood by reference to the following detailed description when considered in connection with the accompanying drawings in which:

FIG. 1 is a schematic side view of a tank truck vehicle constructed in accordance with the present invention;

FIG. 2 is a schematic plan view of a tank truck vehicle constructed in accordance with the present invention illustrating the front and rear axle systems in phantom;

FIG. 3 is a section view taken along line III—III of FIG. 1;

FIG. 4 is a view similar to FIG. 3 illustrating another embodiment of the tank truck vehicle of the present invention;

DESCRIPTION OF THE PREFERRED EMBODIMENTS

Figure 5:
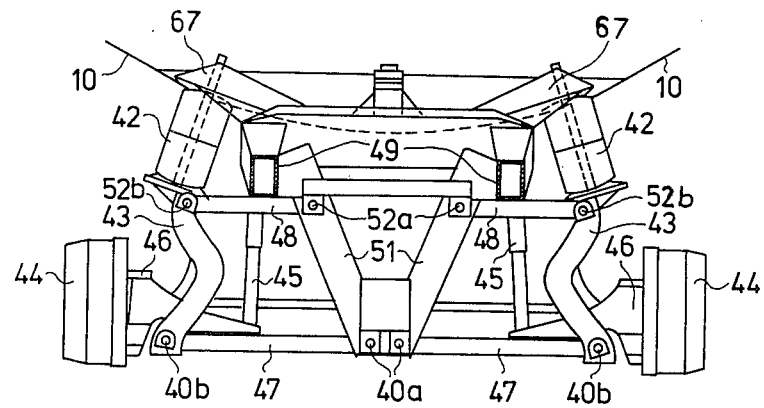
FIG. 5 is a front view of the front axle and suspension system of a tank truck vehicle constructed in accordance with the present invention.

Referring now to the drawings wherein like reference characters designate identical or corresponding parts throughout the several views, and more particularly to FIGS. 1-3 thereof, the tank truck vehicle of the present invention, generally designated 1, comprises a tubular shell 10 having the substantially oval transverse cross section seen in FIG. 3 and whose longitudinal length essentially defines the overall length of the tank truck vehicle.

In accordance with the present invention, the tubular shell 10 defines both the wall of the transporting container S as well as the supporting frame of the tank truck vehicle. The tubular shell 10 is suitably dimensioned and is formed of an appropriate material, such as aluminum or rust-proof steel, such that it is sufficiently rigid to accommodate both the bending and torsional stresses normally incident on a beam frame of a conventional tank truck vehicle so that the provision of such a conventional beam frame is not required in a vehicle constructed according to the present invention.

In order to provide a means whereby various components of the vehicle, such as springs, wheel suspension components and the engine, may be attached to the tubular shell 10, a pair of longitudinally extending beams 28 are integrally formed on the lower wall portion of tubular shellframe 10 so as to comprise a part of the tubular shell. However, it should be noted that beams 28 are not provided for the purpose of imparting rigidity to the tubular shell 10, which rigidity is essentially provided by the construction of the tubular shell 10 itself. In this connection, it is seen that whereas in conventional tank truck vehicles, longitudinally extending beams are separately formed from the transporting container to support the same, the beams 28 are integrally formed with and comprise a part of the tubular shell 10 which defines the transporting container. Further, it is not necessary for the components to be attached to the shell 10 through beams 28 since the components may be attached to the tubular portions thereof.

According to another feature of the present invention, as best seen in FIG. 3, the transverse dimension of the tubular shell 10 which comprises the transporting tank as well as the supporting frame of the tank truck vehicle, is at least as wide as the wheel base or track gauge, i.e., the transverse distance between the wheels, of the vehicle. As seen in FIG. 1, the tubular shell 10 defining the transporting tank S is provided with transversely extending internal partitions 29 which divide the shell interior into a corresponding plurality of compartments 10a, 10b, 10c and 10d. The cabin 13 of the vehicle is located in a conventional manner within an extension of the tubular shell 10. In this connection, it is possible to utilize a prefabricated cabin in which case the cabin is attached to the front end of the tubular shell 10.

Referring to FIGS. 1 and 2 one manner in which the connection of the front and rear axle systems to the tubular shell 10 can be accomplished is schematically illustrated. Thus, the front wheels 14 are provided on the ends of front axle 17, the latter being suspended from the tubular shell frame by a pair of air springs 21 and supporting arms 22. The lower wall portion 32 (FIG. 1) at the rear end region of tubular shell 10 is upwardly raised relative to the main longitudinally extending portion thereof to provide an area within which the rear wheel axle system is mounted. The rear wheel assembly, which in the present embodiment, comprises a bogie type assembly, includes a pair of tandem rear axles 18, 19, the ends of the forward axle 18 each having a pair of wheels 15 associated therewith while the rearward axle 19 of the tandem is provided with single wheels 16. Rear axles 18, 19 are suspended on the tubular shell frame by means of supporting arms 26, 27 and 33, which themselves are pivotally supported on a supporting beam 25, the latter being fastened to the lower wall portion of tubular shell 10. The forward rear axle 18 is fitted with a pair of air springs 23 while the rearward rear axle 19 is fitted with a pair of air springs 24. A typical distribution of a load of 220 kN supported within the tubular shell transporting container S of the present invention is illustrated in FIG. 1 for the particular longitudinal spacing between the respective axles wherein $T_1 = 60$ kN, $T_2 = 100$ kN and $T_3 = 60$ kN.

According to another feature of the present invention, in order to reduce the air resistance presented by the tank vehicle, a pair of longitudinally extending, planar flanges or skirts 12a, 12b are attached along their respective upper longitudinal edge regions to respective side wall portions of the tubular shell 10 so as to extend vertically downwardly as best seen in FIGS. 1 and 3. The flanges 12a, 12b are suitably provided with cut out portions in the areas of the front and rear wheels 14, 15, 16. In this manner, the outer configuration of the tank truck has a uniformly smooth surface thereby considerably reducing the air resistance presented by the vehicle.

The vehicle engine can also be attached substantially directly to the lower wall portion of the tubular shell 10. Thus, the vehicle may be provided with a so-called pancake type engine 20 attached to the lower wall portion of shell 10 between the front and rear wheels 14, 15. It is also possible to utilize a conventional type engine, in which case the engine 20' is preferably mounted rearwardly of wheels 16 as shown in phantom in FIG. 1.

Another embodiment of the tank truck vehicle of the present invention is illustrated in FIG. 4 wherein the shell, designated 10', has a U-shaped transverse cross section and is open at its top. The shell 10' is formed having the appropriate rigidity in order to function both as the transporting container as well as the actual frame of the vehicle. Shell 10' is defined by a curved bottom wall portion 10e, a pair of vertically extending planar side wall portions 10f, 10g and planar end gables 11a, (only one shown). The transporting container defined by shell 10' is especially adapted for the transportation of peat, wood, chips, cereals, plastic material grains, fertilizers and other pulverous or chipped products. The gables 11a of the transporting container are preferably adapted to be upwardly slideable with respect to the shell wall so as to provide an opening into the container from the ends thereof. Further, a trap-door type opening may be provided in the bottom wall portion of the shell 10' for unloading the container from its bottom. When used for the above-described applications, the shell 10' of the tank truck vehicle illustrated in FIG.

4, need not be provided with partitions similar to those provided in connection with the embodiment of FIG. 1.

Figure 6:
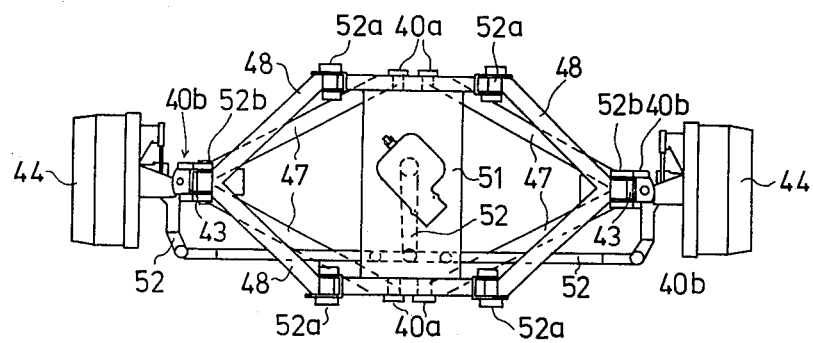
FIG. 6 is a plan view of the front axle system illustrated in FIG. 5.

Referring to FIGS. 5 and 6, a front axle suspension assembly is illustrated wherein the front axle assembly is independently suspended essentially directly from the transporting container frame defined by the tubular shell 10 of the vehicle of the present invention. An axle cradle 51 has its rear end portion attached directly to the bottom wall portion of the shell 10 while its forward end portion is connected to members 49 which protrude forwardly from the container. A pair of wheel hubs 44 are connected by respective king pins 46 to the axle system which comprises two pairs of lower triangular arms 47 which are pivoted at the inner ends to cradle 51 through link pins 40a and at their outer ends to steering arms 43 through link pins 40b.

The front axle system further comprises upper triangular arms 48 pivoted at their inner ends to cradle 51 through link pins 52a and at their outer ends to steering arms 43 through link pins 52b. A pair of shock absorbers 45 and rubber springs 42 are provided, the latter interconnecting the steering arms 43 and supporting members 67. Supporting members 67 are directly fastened to the bottom wall portion of the tubular shell 10 and protrude forwardly from the bottom edge thereof beyond the front wall. Finally, the front axle system also includes conventional steering apparatus, designated 52.

Figure 7:
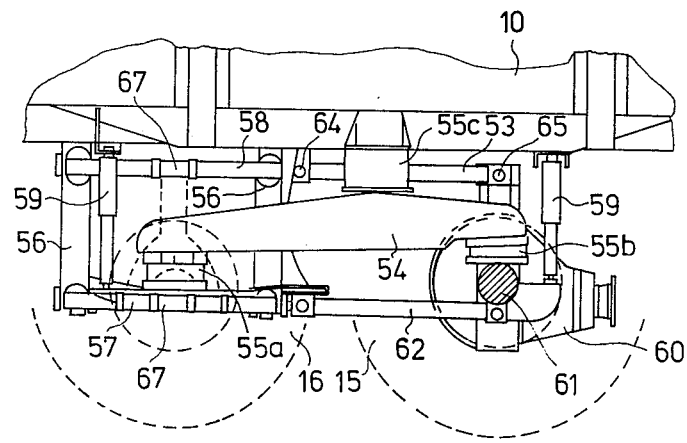
FIG. 7 is a side view of the rear axle suspension system of a tank truck vehicle constructed in accordance with the present invention.
Figure 8:
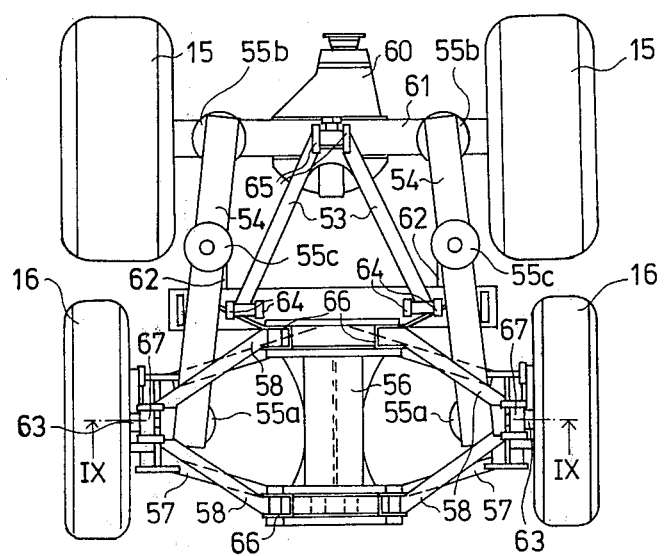
FIG. 8 is a plan view of the rear axle system of the present invention illustrated in FIG. 7; and, FIG. 9 is a partial section view taken along line IX—IX of the rear axle suspension system of a tank truck vehicle constructed in accordance with the present invention.
Figure 9:
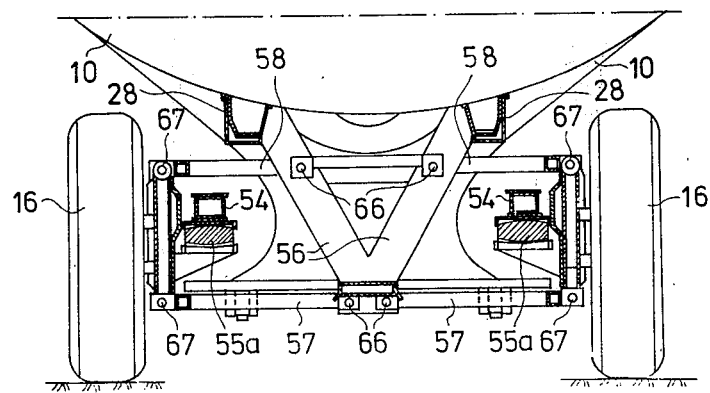

Referring now to FIGS. 7-9, the rear axle suspension assembly which, as mentioned above, comprises a bogie-type suspension assembly, is illustrated. The rear axle assembly comprises a forward rigid driving axle 61 on whose ends the wheels 15 are mounted and a rearward, independently suspended bogie axle 63 on whose ends the wheels 16 are mounted. A pair of connecting beams 54 interconnect forward and rearward axles 61, 63 and serve to distribute the load therebetween in a desired manner. Connecting beams 54 are connected to axles 61, 63 by means of rubber springs 55a, 55b. In turn, each connecting beam 54 is suspended from the bottom wall portion of tubular shell 10 by a rubber spring 55c which is located intermediate of springs 55a, 55b on the opposed surface of connecting beam 54.

The driving axle 61 is further supported at its central region by upper and lower reaction rods 53, 62, respectively, as best seen in FIG. 7. Thus, upper reaction rods 53 are pivoted at their forward ends to axle 61 through respective links 65 and are connected at their rearward ends to the bottom wall portion of tubular shell 10 to a lug 64.

The rear wheels 16 are independently suspended, the respective bogie axles 64 being supported by lower and upper double triangle arms 57, 58. The upper double triangle arms are supported at their inner ends on the bogie cradle 56 by means of links 66 while their outer ends are connected to respective axles 63 by means of links 67.

As mentioned above, the forward axles 61 of the pair of rear tandem axles 61, 63 is the driving axle and the motive force is supplied thereto through conventional power train apparatus, designated 60. Two pairs of shock absorbers 59 are also provided and interconnect the rear axle system and the bottom wall portion of tubular shell 10. The pair of longitudinally extending beams 28 formed as part of the tubular shell 10 as described above in connection with FIG. 3, are also illustrated in FIG. 9. The cross beams of cradle 56 are conventionally supported on these beams.

Thus, it will be apparent from the above, that the various components supported on the bottom wall portion of tubular shell 10 can be easily replaced and/or serviced merely by disconnecting the same from the bottom wall portion in a manner which is readily apparent from the above description. Thus, for example, should it be desired to service or replace components of the rear axle system, it is merely necessary to disconnect the rear axle cradle 56 from the supporting beams 28 of tubular shell 10. In a similar manner, the engine and front axle assemblies may be similarly disconnected for servicing or replacement.

Obvious, numerous modifications and variations of the present invention are possible in the light of the above teachings. For example, the rubber springs mentioned above can be replaced within the scope of the present invention by air springs which may be fastened to the same components as described above in connection with the rubber springs. Accordingly, it is understood that the invention may be varied within the scope of the appended claims.

What is claimed is:

1. A land vehicle, such as a tank truck, for transporting fluid, pulverous, granular and/or chipped material and, in particular, for transporting oil, in a transporting container, said vehicle having an engine, power transmission means and front and rear wheels, comprising:

a longitudinally extending substantially tubular shell defining said transporting container having a transverse dimension at least as great as the wheel base of said vehicle, and a longitudinal dimension essentially as long as the vehicle, said shell having a structure which is sufficiently rigid such that said shell comprises both the sole means for defining said transporting container as well as the sole means for defining the supporting frame of the vehicle so that the vehicle supporting frame does not include any supporting frame structure separate from said tubular shell;

an engine and power transmission means substantially directly supported by said tubular shell beneath the same; and wherein said front wheels are connected to a front axle and said front axle is substantially directly supported by said tubular shell in substantial alignment with the forward end of said shell;

whereby by virtue of said vehicle being devoid of any supporting frame structure other than said tubular shell, said vehicle has a smaller overall height and lower center of gravity than conventional vehicles of this type.

2. A land vehicle, such as a tank truck for transporting fluid, pulverous, granular and/or chipped material and, in particular, for transporting oil, in a transporting container, said vehicle having an engine and front and rear wheels, comprising:

a longitudinally extending shell defining said transporting container having a transverse dimension at least as great as the wheel base of said vehicle, and a longitudinal dimension essentially as long as the vehicle, said shell having a structure which is sufficiently rigid such that said shell comprises both the sole means for defining said transporting container as well as the sole means for defining the supporting frame of the vehicle in a manner such that no additional beam frame is required; and front and rear axle systems, each of said axle systems including at least one axle and a respective cradle, the latter being substantially directly fastened to the bottom surface of such transporting container, and wherein said rear axle system further includes a pair of rear axles comprising a substantially rigid driving axle and an independently suspended bogie axle.

3. A tank truck vehicle as recited in claim 2 further including a pair of bogie connecting beams, each of said connecting beams being supported by supporting means at its respective end portions on respective ones of said rear axles for dividing the load between the two rear axles, each of said connecting beams supportingly engaging the bottom of said container through spring means at a point intermediate of said rear axles determined by the load division desired between said pair of rear axles.

4. A tank truck vehicle as recited in claim 3 further including a pair of upper reaction rods which at least partially support said driving axle, each of said upper reaction rods being attached at one of its ends by a fastening lug to the bottom surface of said transporting container at the substantial side of said bogie axle.

* * * * *